Nov. 4, 1952  G. L. ROBINSON ET AL  2,616,350
DEPTH CONTROLLER

Filed Sept. 6, 1949                       3 Sheets-Sheet 1

INVENTOR
GARNER LAVERNE ROBINSON
JOHN E. HINDLE
BY
Fetherstonhaugh & Co.
ATTORNEYS Nov. 4, 1952  G. L. ROBINSON ET AL  2,616,350
DEPTH CONTROLLER Filed Sept. 6, 1949  3 Sheets-Sheet 2

INVENTOR
GARNER LAVERNE ROBINSON
JOHN E. HINDLE
BY
Fetherstonhaugh & Co.
ATTORNEYS Nov. 4, 1952 — G. L. ROBINSON ET AL — 2,616,350
DEPTH CONTROLLER
Filed Sept. 6, 1949 — 3 Sheets-Sheet 3

INVENTOR
GARNER LAVERNE ROBINSON
JOHN E. HINDLE
BY
Fetherstonhaugh & Co.
ATTORNEYS Patented Nov. 4, 1952

2,616,350

UNITED STATES PATENT OFFICE 2,616,350

DEPTH CONTROLLER

Garner Laverne Robinson, Milner, British Columbia, and John E. Hindle, White Rock, British Columbia, Canada Application September 6, 1949, Serial No. 114,182

3 Claims. (Cl. 97—50)

This invention relates to improvements in depth controllers for argicultural implements, such as plows, discs, cultivators, and the like.

An object of the present invention is the provision of a depth controller particularly for agricultural implements which are completely carried by a tractor, and which will not interfere in any way with the normal operation of the implement or the tractor.

Another object is the provision of a depth controller which does not carry any part of the weight of the implement.

Another object is the provision of a very simple and efficient device for maintaining an agricultural implement at a desired depth in the ground regardless of any unevenness in the latter.

At present, there are tractors having mechanism at the rear thereof for supporting an agricultural implement. It also has a hydraulic system for raising and lowering the implement in relation to the ground. A lever is provided which is operated by the driver of the tractor to maintain the implement at a desired depth in the ground. This means that on uneven ground the driver must keep his eye on the implement while trying to steer the tractor.

It is the main purpose of this invention to provide apparatus for automatically operating the hydraulic lever to maintain the implement at a desired depth. This apparatus is designed so that it does not interfere with the ordinary operation of the hydraulic mechanism, and the driver of the vehicle may direct the implement deeper into the ground or he may lift it completely out of the ground, if he so desires. This is accomplished by means of an arm pivotally mounted on the tractor adjacent the implement, said arm having a bearing at its free end, usually in the form of a wheel, adapted to ride on the ground. Suitable means is provided for connecting the arm to the operating lever of the hydraulic mechanism. When the free end of the arm rises and falls on uneven ground, it moves the operating lever to raise or lower the implement, thus maintaining it at a desired depth.

Figure 1:
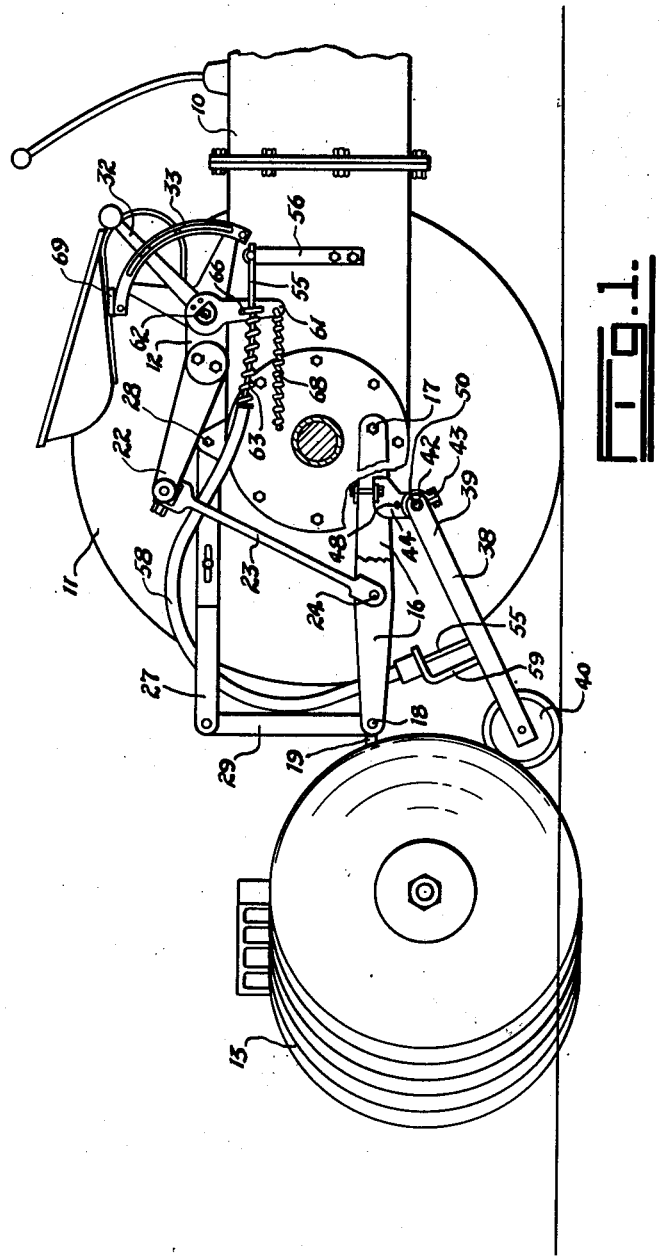
Figure 2:
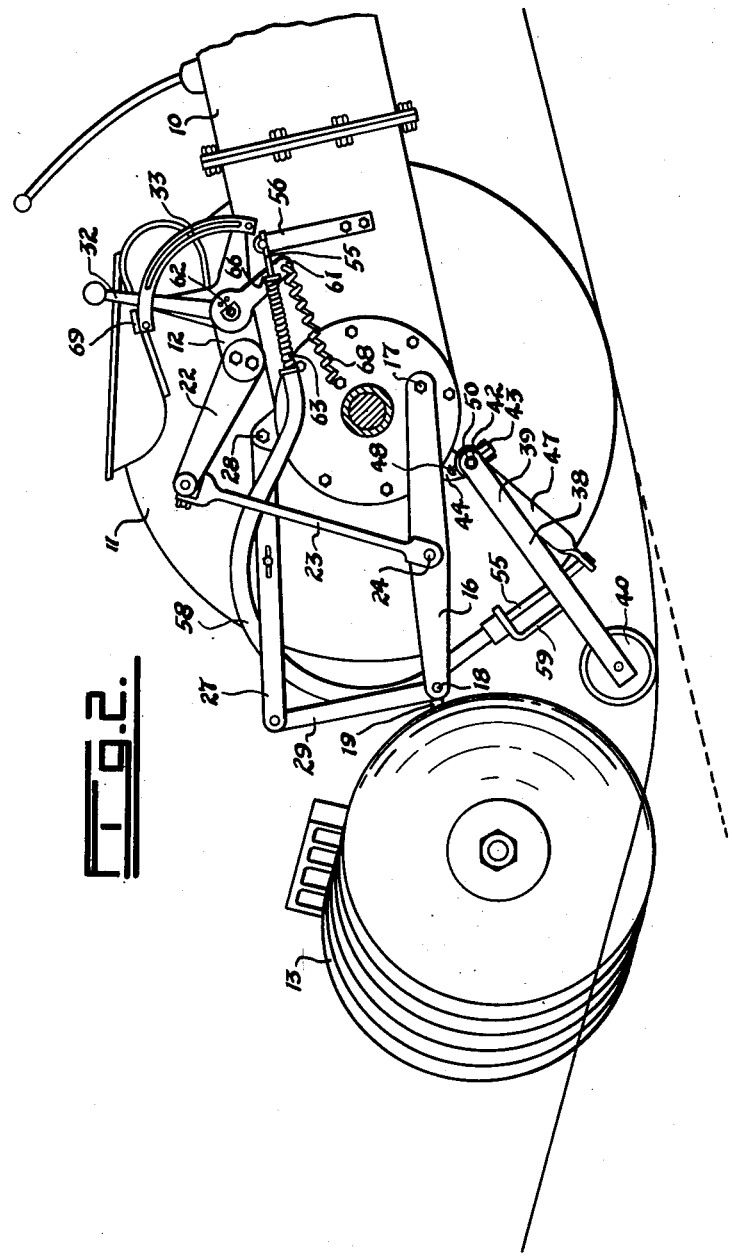
Figure 3:
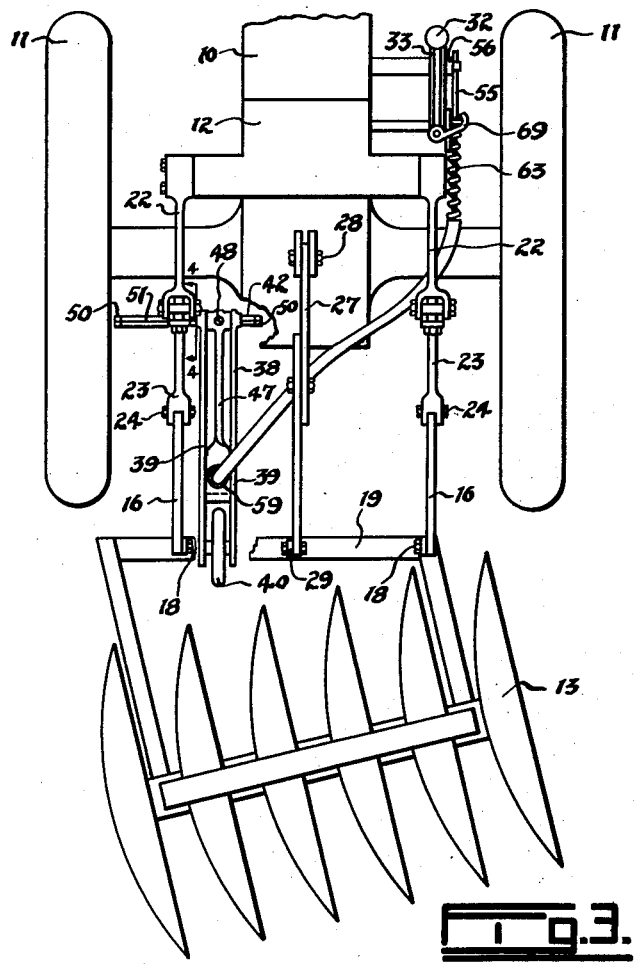
Figure 4:
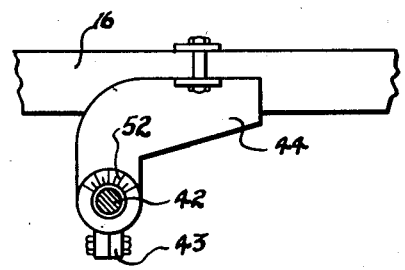

An example of this invention is illustrated in the accompanying drawings, in which, Figure 1 is a side elevation of the rear end of a tractor with the near wheel removed, showing the implement and depth controller in elevation, Figure 2 is a similar view showing the tractor starting up an incline, Figure 3 is a plan view of the depth controller, and Figure 4 is an enlarged section taken substantially on the line 4—4 of Figure 3.

Referring to the drawings, 10 is a tractor having rear wheels 11, and a hydraulic mechanism 12 mounted thereon for raising and lowering an argicultural implement, such as a disc plow 13. A pair of supports 16 are pivotally mounted at one end, as at 17, on the tractor, while their opposite ends are connected at 18 to the frame 19 of the plow. A pair of arms 22 project outwardly from opposite sides of the hydraulic mechanism 12, and are connected by links 23 to the supports 16 at 24. A bar 27 is pivotally mounted on the tractor at 28 adjacent the hydraulic mechanism, and is connected at its outer end by a vertical link 29 to the frame 19. The bar 27 and link 29 are substantially midway between the supports 16 and their associated parts. An operating lever 32 is mounted on the hydraulic mechanism and controls the latter, said lever working in connection with a quadrant 33.

All the mechanism described so far is standard equipment. When the driver of the tractor moves the operating lever 32 to its uppermost position on the quadrant, the hydraulic mechanism lifts the plow 13 and holds it above the ground. When the operating lever is moved in the opposite direction, the hydraulic mechanism moves the plow towards and into the ground, the depth of penetration depending upon the position of the operating lever.

An arm 38 is pivotally mounted at one end on the tractor and has a bearing at its opposite end. In this example, the arm consists of spaced side members 39 having a wheel 40 rotatably mounted therebetween at their outer ends. The side members of the arm 38 are pivotally mounted on a shaft 42 which extends transversely of the tractor. This shaft is held in a clamp 43, see Figure 4, which is carried by a bracket 44 mounted either directly on the tractor or, as illustrated, on one of the supports 16. An anchor bar 47 is pivotally mounted on the shaft 42 between the side members of the arm 38. This bar extends outwardly from this shaft generally in the same direction as the arm, and it is provided with a set screw 48 for retaining said bar on the shaft in any adjusted position in relation to the arm.

By referring to Figure 3, it will be seen that the shaft 42 extends outwardly on both sides of the support 16, while the arm 38 and anchor bar 47 are mounted on the shaft on one side of said support. If it is desired to shift the arm 38 and its wheel laterally in relation to the tractor, the arm and anchor bar may be positioned on the shaft on the opposite side of the support 16 to that shown in the drawings.

The position of the anchor bar 47 may be changed in relation to the arm 38 by loosening the clamp 43 and rotating the shaft 42 one way or the other. The ends of this shaft are squared, as at 50, to enable a wrench to be applied to the shaft. To assist in this adjustment, the shaft may have an indicating mark 51 thereon, see Figure 3, while a scale 52 is located on the side of the clamp 43, see Figure 4. This will enable a person to see how much the shaft 42 is being turned.

A cable mounted in a tubular casing is provided for connecting the arm 38 to the operating lever 32. In this example, a cable 55 is connected at one end to the anchor bar 47 and is anchored at its opposite end adjacent the operating lever. A bracket 56 mounted on the tractor is provided for this purpose, and the end of the cable is connected to this bracket. A tubular casing 58 is slidably mounted on the cable and connects the arm to the operating lever. One end of this casing is secured to the arm by a connector 59. A finger 61 is connected to the operating lever and extends below the pivot point 62 thereof. An end of the casing 58 may be connected directly to this finger, but it is preferable to have a spring 63 mounted on the cable 55 extending from the end of the casing to a lug 66 projecting outwardly from said finger. The cable 55 freely extends through a hole in said lug.

A spring 68 connected at its opposite ends to the outer end of the finger 61 and to the tractor, normally urges the operating lever downwardly on its quadrant. A catch 69 is provided at the top of the quadrant for holding the operating lever in its uppermost position, at which time the plow 13 is held above the ground.

When it is desired to lower the plow, it is only necessary to release the operating lever 32 from the catch 69. The spring 68 moves the lever downwardly on its quadrant. This causes the hydraulic mechanism 12 to operate to lower the plow. This operation and the weight of the plow causes the latter to penetrate into the earth. When the wheel 40 of the arm 38 engages the ground, it stops moving downwardly, thus preventing the tubular casing 58 from moving. This moves the operating lever to a predetermined position on its quadrant so that the hydraulic mechanism stops and prevents the plow from penetrating the ground beyond a certain position. During movement of the tractor, if the arm 38 pivots upwardly, the casing 58 moves along the cable 55 and moves the operating lever towards its uppermost position to cause the hydraulic mechanism to raise the plow. If the arm pivots downwardly from its normal position, the tubular casing moves the operating lever in the opposite direction to cause the plow to be moved downwardly. Thus, on uneven ground the arm 38 moves up and down to cause the plow to be lifted or lowered in order to maintain it at a predetermined depth in the ground. The spring 63, if employed, prevents the device from being too sensitive to minor undulations in the ground.

If the tractor starts up a hill, as shown in Figure 2, the natural tendency is for the plow to dig deeper into the earth. However, this depth controller prevents this action from taking place. At this time, the outer end of the arm 38 raises in relation to the longitudinal and horizontal axis of the tractor. This moves the operating lever upwardly on its quadrant to cause the hydraulic mechanism to lift the plow sufficiently to maintain its proper depth. When the front end of the tractor drops in relation to its rear wheels, the tendency is for the plow to lift out of the ground. At this time, however, the outer end of the arm 38 moves downwardly from its normal position, and moves the operating lever downwardly on its quadrant to cause the hydraulic mechanism to move the plow downwardly to maintain its proper depth.

With this depth controller, the driver of the tractor does not have to keep his eye on the plow when he is on uneven ground. It will be noted that the plow is still free to ride up over any obstacle, such as a stone. If by any chance the driver wished to have the plow move deeper into the earth, he can move the operating lever downwardly and the spring 63 will compress sufficiently to allow this since the casing 58 cannot move unless the arm 8 moves.

The depth at which the plow is normally maintained may be regulated by turning the shaft 42 to change the position of the anchor bar 47 in relation to the normal position of the arm 38. When the bar is moved downwardly in relation to the arm, the tubular casing moves along the cable so that the operating lever is moved upwardly on the quadrant. Thus, the normal depth of the plow is less than it was previously. When the anchor bar is moved upwardly in relation to the normal position of the arm, the casing is moved on the cable in the opposite direction to move the operating lever into a lower position. This moves the plow further into the ground.

What we claim as our invention is:

1. A depth controller for an agricultural implement mounted on a tractor having a hydraulic mechanism for raising and lowering the implement and a control lever for operating said mechanism, which comprises an arm pivotally mounted on the tractor adjacent the implement, a bearing at the free end of the arm adapted to ride on the ground, two elements consisting of a wire extending through a tubular casing, the opposite ends of one of said elements being anchored adjacent the arm and the lever, and the opposite ends of the other element being connected to the arm, and a spring connecting the other end of said last-mentioned element to the lever, whereby the lever is moved to operate the hydraulic mechanism when the free end of the arm rises and falls on uneven ground.

2. A depth controller for an agricultural implement mounted on a tractor having a hydraulic mechanism for raising and lowering the implement and a control lever for operating said mechanism, which comprises an arm pivotally mounted on the tractor adjacent the implement, a bearing at the free end of the arm adapted to ride on the ground, a wire anchored at its opposite ends adjacent the arm and the lever, a tubular casing slidably mounted on the wire connected at one end to the arm and extending to a point near the lever, and a spring connecting the latter end of the casing to the lever, whereby the lever is moved to operate the hydraulic mechanism when the free end of the arm rises and falls on uneven ground.

3. A depth controller for an agricultural implement mounted on a tractor having a hydraulic mechanism for raising and lowering the implement and a control lever for operating said mechanism, which comprises a shaft carried by and extending transversely of the tractor adjacent the implement, an arm pivotally mounted at one end on the shaft, said arm consisting of spaced side members substantially parallel with each other, a wheel mounted on the free end of the arm between the side members thereof, said wheel being adapted to ride on the ground, an anchor bar pivotally mounted on the shaft between the arm members, means for retaining the bar on the shaft in any adjusted position in relation to the longitudinal axis of the tractor, and two elements consisting of a wire extending through a tubular casing, the opposite ends of one of said elements being connected to the arm and the lever, and one end of the other element being connected to the anchor bar and its opposite end anchored adjacent the lever, whereby the lever is moved to operate the hydraulic mechanism when the free end of the arm rises and falls on uneven ground.

GARNER LAVERNE ROBINSON.
JOHN E. HINDLE.

REFERENCES CITED

The following references are of record in the file of this patent:

UNITED STATES PATENTS

| Number | Name | Date |
|---|---|---|
| 534,403 | Mechwart | Feb. 19, 1895 |
| 2,363,292 | Brown | Nov. 21, 1944 |
| 2,527,840 | Mott | Oct. 31, 1950 |
| 2,567,107 | Gobeil | Sept. 4, 1951 |

FOREIGN PATENTS

| Number | Country | Date |
|---|---|---|
| 846,027 | France | May 27, 1939 |
| 520,484 | Great Britain | Apr. 25, 1940 |
| 541,436 | Great Britain | Nov. 26, 1941 |
| 599,020 | Great Britain | Mar. 3, 1948 |